US011245708B2

(12) United States Patent
Seshappa et al.

(10) Patent No.: US 11,245,708 B2
(45) Date of Patent: Feb. 8, 2022

(54) MODEL-BASED SYSTEM, METHOD, AND COMPUTER PROGRAM PRODUCT FOR DETECTING AT LEAST POTENTIALLY UNWANTED ACTIVITY ASSOCIATED WITH CONFIDENTIAL DATA

(75) Inventors: Balachander Seshappa, Bangalore (IN); Deepakeswaran Kolingivadi, Bangalore (IN)

(73) Assignee: MCAFEE, LLC, San Jose, CA (US)

( * ) Notice: Subject to any disclaimer, the term of this patent is extended or adjusted under 35 U.S.C. 154(b) by 358 days.

(21) Appl. No.: 12/178,220

(22) Filed: Jul. 23, 2008

(65) Prior Publication Data
US 2013/0276127 A1 Oct. 17, 2013

(51) Int. Cl.
| | |
|---|---|
| *H04L 29/06* | (2006.01) |
| *G06F 21/62* | (2013.01) |
| *G06F 21/52* | (2013.01) |
| *G06F 21/55* | (2013.01) |

(52) U.S. Cl.
CPC .......... *H04L 63/1416* (2013.01); *G06F 21/52* (2013.01); *G06F 21/554* (2013.01); *G06F 21/6218* (2013.01)

(58) Field of Classification Search
CPC .......... G06F 12/14; G06F 17/18; G06F 16/29; G06F 30/00; G06F 15/00; G06F 16/244; G06F 16/248; G06F 16/254; G06F 16/284; G06F 17/00; G06F 17/40; G06F 19/00; G06F 30/20; G06F 3/017; G06F 3/04815; G05B 19/418
USPC .......................................... 726/25; 705/37, 8
See application file for complete search history.

(56) References Cited

U.S. PATENT DOCUMENTS

| | | | | |
|---|---|---|---|---|
| 5,754,938 | A * | 5/1998 | Herz et al. | 725/116 |
| 6,029,195 | A * | 2/2000 | Herz | 725/116 |
| 6,640,304 | B2 * | 10/2003 | Ginter | H04N 21/2543 713/193 |
| 6,859,909 | B1 * | 2/2005 | Lerner | G06F 40/169 715/203 |
| 7,797,725 | B2 * | 9/2010 | Lunt et al. | 726/1 |
| 7,841,008 | B1 * | 11/2010 | Cole | G06F 21/577 726/25 |
| 2001/0021926 | A1 * | 9/2001 | Schneck | G06F 21/577 705/54 |
| 2002/0052827 | A1 * | 5/2002 | Waelbroeck et al. | 705/37 |
| 2003/0159070 | A1 * | 8/2003 | Mayer et al. | 713/201 |
| 2004/0205514 | A1 | 10/2004 | Sommerer et al. | |

(Continued)

OTHER PUBLICATIONS

Ron White, How Computers Work, Oct. 15, 2003, Que Publishing, 7th Ed, p. 4.*

(Continued)

*Primary Examiner* — Patrick McAtee
*Assistant Examiner* — Nakia Leffall-Allen
(74) *Attorney, Agent, or Firm* — Hanley, Flight & Zimmerman, LLC

(57) ABSTRACT

A model-based system, method, and computer program product are provided for detecting at least potentially unwanted activity associated with confidential data. In use, behavior information associated with use of confidential data is identified, based on predetermined parameters. Additionally, a model is created utilizing the behavioral information. Furthermore, at least potentially unwanted activity associated with the confidential data is detected utilizing the model.

10 Claims, 6 Drawing Sheets

(56) References Cited

U.S. PATENT DOCUMENTS

| | | | | |
|---|---|---|---|---|
| 2004/0267700 | A1* | 12/2004 | Dumais | G06F 16/9535 |
| 2005/0183005 | A1* | 8/2005 | Denoue | G06F 40/169 |
| | | | | 715/202 |
| 2006/0123461 | A1* | 6/2006 | Lunt et al. | 726/1 |
| 2006/0184410 | A1* | 8/2006 | Ramamurthy | G06Q 10/10 |
| | | | | 706/8 |
| 2006/0259950 | A1 | 11/2006 | Mattsson | |
| 2006/0282660 | A1* | 12/2006 | Varghese | G06Q 20/4016 |
| | | | | 713/155 |
| 2007/0220604 | A1* | 9/2007 | Long | G06F 21/50 |
| | | | | 726/22 |
| 2007/0220614 | A1* | 9/2007 | Ellis | G06F 21/6245 |
| | | | | 726/27 |
| 2008/0114709 | A1* | 5/2008 | Dixon | H04L 63/1483 |
| | | | | 706/13 |
| 2008/0133540 | A1* | 6/2008 | Hubbard | H04L 63/1483 |
| 2008/0162202 | A1* | 7/2008 | Khanna et al. | 705/7 |
| 2009/0018947 | A1* | 1/2009 | Waelbroeck et al. | 705/37 |
| 2009/0144821 | A1* | 6/2009 | Wong et al. | 726/22 |
| 2009/0183257 | A1* | 7/2009 | Prahalad | G06F 21/6218 |
| | | | | 726/22 |
| 2010/0076883 | A1* | 3/2010 | Lutnick et al. | 705/37 |

OTHER PUBLICATIONS

Ron White, How Computers Work, Oct. 15, 2003, Que Publishing, 7th Ed, p. 4 (Year: 2003).*

* cited by examiner

MODEL-BASED SYSTEM, METHOD, AND COMPUTER PROGRAM PRODUCT FOR DETECTING AT LEAST POTENTIALLY UNWANTED ACTIVITY ASSOCIATED WITH CONFIDENTIAL DATA

FIELD OF THE INVENTION

The present invention relates to securing confidential data, and more particularly to systems for detecting potentially unwanted activity associated with confidential data.

BACKGROUND

Traditionally, confidential data has been secured by detecting unwanted activity, or at least potentially unwanted activity, associated with such confidential data. To this end, data leakage of the confidential data has generally been prevented based on the detection of the unwanted activity associated with the confidential data. However, traditional techniques utilized for detecting unwanted activity associated with confidential data have exhibited various limitations. Just by way of example, such traditional techniques have failed to detect unwanted activity based on behaviors of a user with respect to the confidential data (e.g. the user reading the confidential data and making notes in digital or paper form, etc.).

There is thus a need for addressing these and/or other issues associated with the prior art.

SUMMARY

A model-based system, method, and computer program product are provided for detecting at least potentially unwanted activity associated with confidential data. In use, behavior information associated with use of confidential data is identified, based on predetermined parameters. Additionally, a model is created utilizing the behavioral information. Furthermore, at least potentially unwanted activity associated with the confidential data is detected utilizing the model.

DETAILED DESCRIPTION

Figure 1:
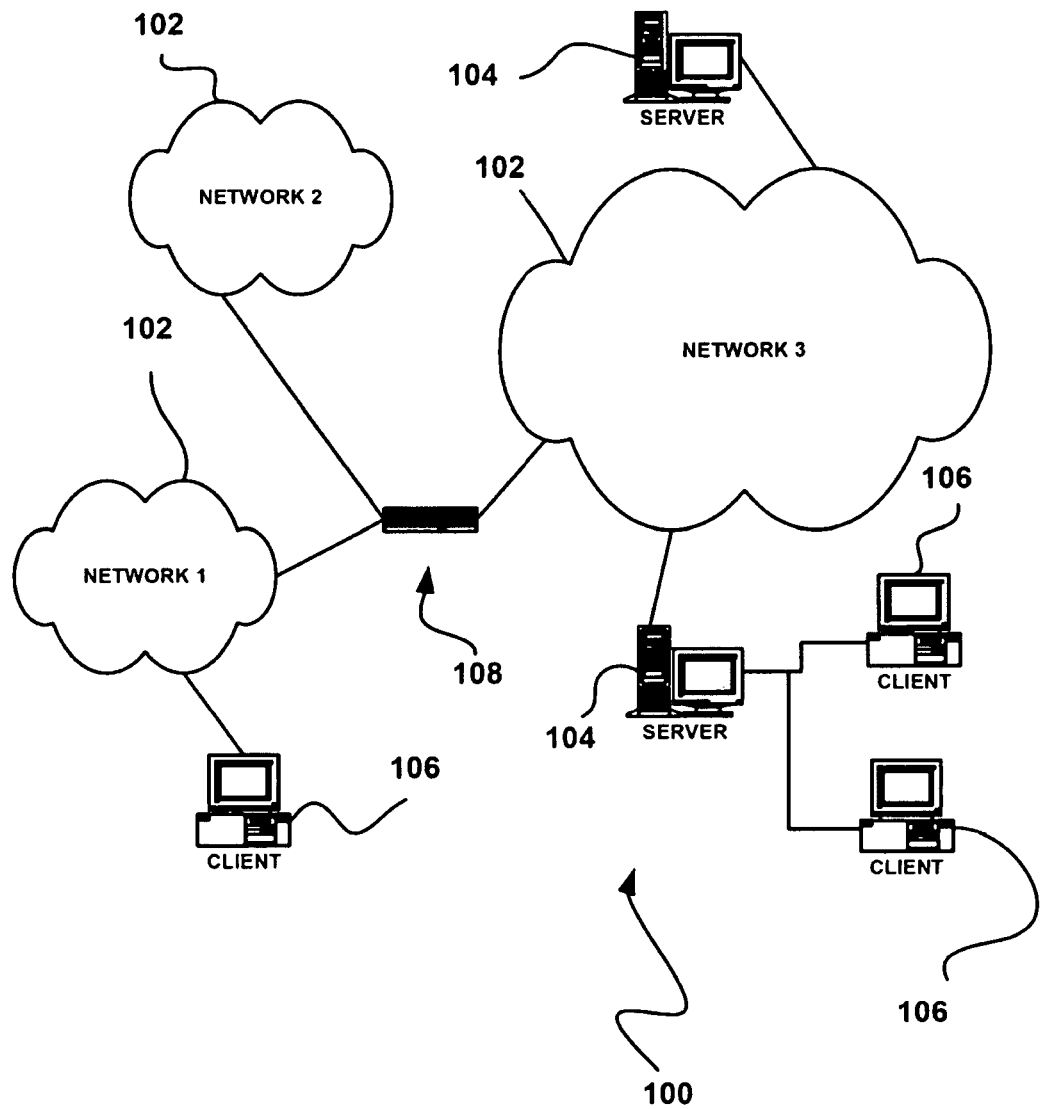
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
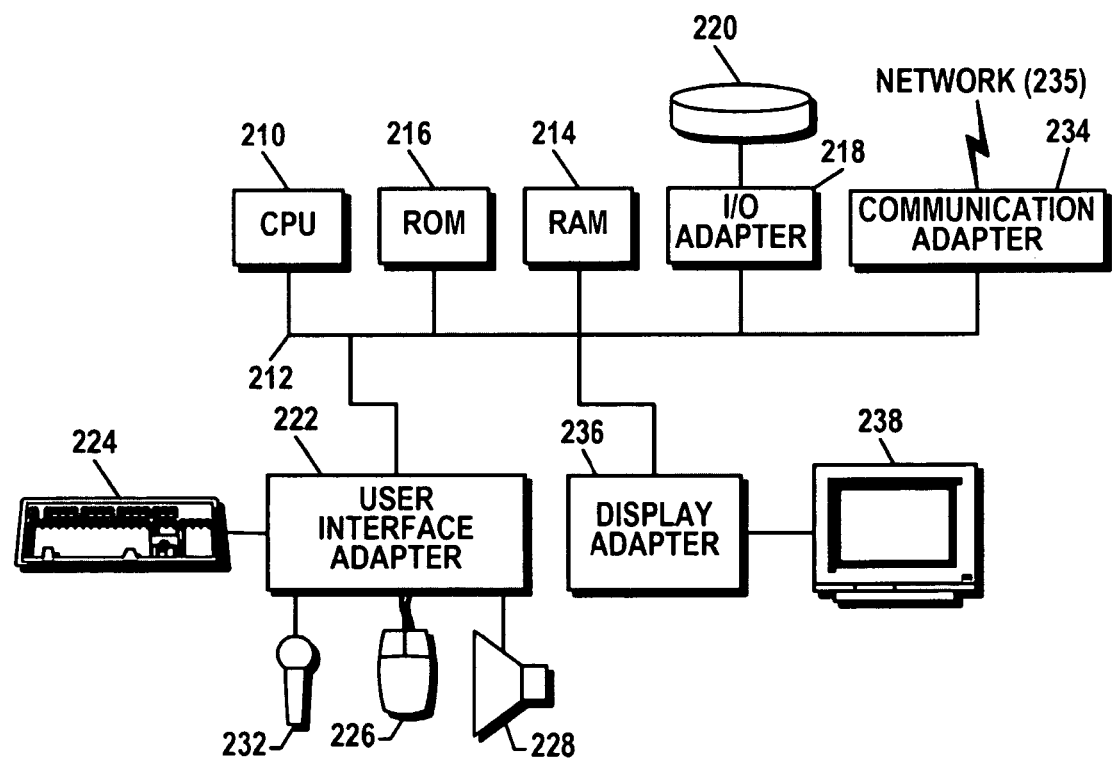
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof For that matter, any type of logic may be utilized which is capable of implementing the various functionality set forth herein.

Figure 3:
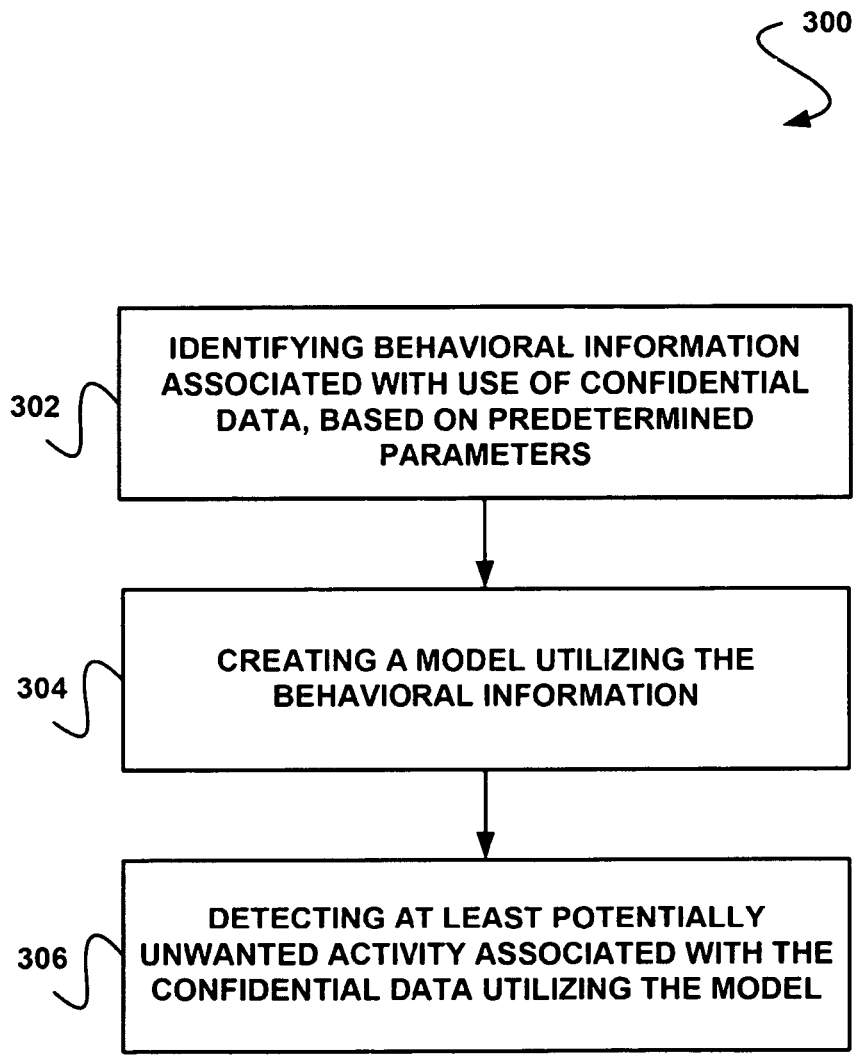
FIG. 3 shows a model-based method for detecting at least potentially unwanted activity associated with confidential data, in accordance with one embodiment.

FIG. 3 shows a model-based method 300 for detecting at least potentially unwanted activity associated with confidential data, in accordance with one embodiment. As an option, the method 300 may be carried out in the context of the architecture and environment of FIGS. 1 and/or 2. Of course, however, the method 300 may be carried out in any desired environment.

As shown in operation 302, behavioral information associated with use of confidential data is identified, based on predetermined parameters. With respect to the present description, the behavioral information may include any digital data representative of use of the confidential data. For example, the behavioral information may represent use of the confidential data (e.g. interaction with the confidential data) by a user. To this end, the behavioral information may indicate the use of the confidential data.

In one embodiment, the behavioral information may be represented by parameters corresponding to user actions conducted in association with the confidential data. The parameters corresponding to the user actions may each identify a different use of the confidential data. In various embodiments, such use of the confidential data (e.g. user actions conducted in association with the confidential data, etc.) may include opening the confidential data, reading the confidential data, writing to the confidential data, storing the confidential data, scrolling the confidential data (e.g. scrolling through a page of the confidential data), revisiting (e.g. re-opening, etc.) the confidential data, generating indicia in association with the confidential data (e.g. generating digital notes and/or citations in association with a read of the confidential data), highlighting the confidential data, annotating the confidential data, and/or any other use associated with access to the confidential data.

As a further option, the parameters corresponding to the user actions may each indicate information associated with the use of the confidential data. For example., the parameters may indicate a speed in which the confidential data is read, a speed in which the confidential data is scrolled, a frequency with which the confidential data is scrolled, a frequency with which the confidential data is revisited (e.g. within a predetermined period of time), an amount of time of the use of the confidential data, a date and/or time of the use of the confidential data, etc.

It should be noted that the confidential data may be any data (e.g. file, folder, web page, etc.) predetermined to be confidential. Optionally, the confidential data may be confidential with respect to the user, an organization, etc. For example, the confidential data may be predetermined to be confidential based on a determination that the confidential data includes content predetermined (e.g. by an administrator, etc.) to be confidential.

Additionally, the behavioral information may be identified in any manner that is based on predetermined parameters. With respect to the present description, the predetermined parameters may include any parameters capable of being associated with use of the confidential data (e.g. capable of corresponding to user actions conducted in association with the confidential data, etc.) that are predetermined. For example, the predetermined parameters may include various types of use of the confidential data, such as any of the uses of confidential data described above. As an option, the predetermined parameters may be configured by an administrator.

In one embodiment, use of the confidential data may be monitored based on the predetermined parameters. Thus, behavioral information associated with use of the confidential data may optionally be identified in response to a determination that such use corresponds to the predetermined parameters. Just by way of example, the predetermined parameters may include reading confidential data, such that use of the confidential data may be monitored for detecting a read of the confidential data and identifying behavioral information associated with the read of the confidential data.

Further, a model is created utilizing the behavioral information, as shown in operation 304. With respect to the present description, the model may include any information capable of being utilized to detect at least potentially unwanted activity associated with the confidential data, as described in more detail below with respect to operation 306. For example, the model may include a data structure representing the use of the confidential data.

In one embodiment, the model may include the behavioral information. Thus, creating the model utilizing the behavioral information may optionally include storing the behavioral information in a single data structure encompassing the model. Just by way of example, the model may be created to include the parameters corresponding to the user actions conducted in association with the confidential data.

Moreover, the model may be created manually, in one embodiment. For example, an administrator may utilize the behavioral information to create the model. As an option, the administrator may modify the behavioral information in any desired manner for creating the model.

In another embodiment, the model may be created automatically. For example, the model may be created based on a template. Optionally, the behavioral information may be input into the template for creating the model. Of course, it should be noted that the model may be created in any desired manner that utilizes the behavioral information.

Still yet, as shown in operation 306, at least potentially unwanted activity associated with the confidential data is detected utilizing the model. Such potentially unwanted activity may include any activity associated with the confidential data that is potentially unwanted. For example, the potentially unwanted activity may include activity associated with the confidential data for which it is unknown whether such activity is unwanted, activity associated with the confidential data which may subsequently result in unwanted activity, etc.

Of course, in another embodiment, unwanted activity associated with the confidential data may be detected utilizing the model. With respect to the present description, the unwanted activity may include activity associated with the confidential data that is determined to be unwanted. Just by way of example, the unwanted activity may include unwanted (e.g. unauthorized, etc.) data leakage of the confidential data. The data leakage may optionally include disclosure of the confidential data (e.g. to a user unauthorized to have knowledge of the confidential data, etc.). As another example, the unwanted activity may include unwanted use of the confidential data.

In one embodiment, the potentially unwanted activity associated with the confidential data may be detected by comparing the model to predefined models of known unwanted activity. For example, models may be predefined for activity associated with confidential data that has previously been determined to be unwanted. Optionally, any desired security system, administrator, etc. may have previously been determined such activity to be unwanted, for generating the predefined models therefrom.

Thus, as an option, if the model created utilizing the behavioral information matches one of the predefined models, potentially unwanted activity associated with the confidential data may be detected. As another option, if the model created utilizing the behavioral information matches a threshold amount (e.g. predefined threshold percentage, etc.) of one of the predefined models, potentially unwanted activity associated with the confidential data may be detected. Such threshold amount may be configured manually by an administrator, for example.

In another embodiment, the potentially unwanted activity associated with the confidential data may be detected by comparing a score of the model created utilizing the behavioral information to a predefined threshold score. The predefined threshold score may optionally be configured manually be an administrator, automatically based on an average score calculated based on previous use of the confidential data (e.g. across multiple other users, etc.), etc.

For example, a score of the model created utilizing the behavioral information may be calculated. Optionally, such score may be calculated based on values (e.g. weights) of the behavioral information, such as values of the parameters corresponding to user actions conducted in association with the confidential data, etc. Thus, such values may reflect the user actions and may be stored in association with the parameters. Furthermore, the model may store the parameters and the associated values, such that the model may be created (in operation 304) utilizing the parameters and the values. Accordingly, if the score of the model meets the predefined threshold score, the potentially unwanted activity associated with the confidential data may be detected.

Of course, it should be noted that the potentially unwanted activity associated with the confidential data may be detected in any desired manner that utilizes the model. In this way, at least potentially unwanted activity associated with the confidential data may be detected using a model created utilizing behavioral information associated with use of the confidential data.

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
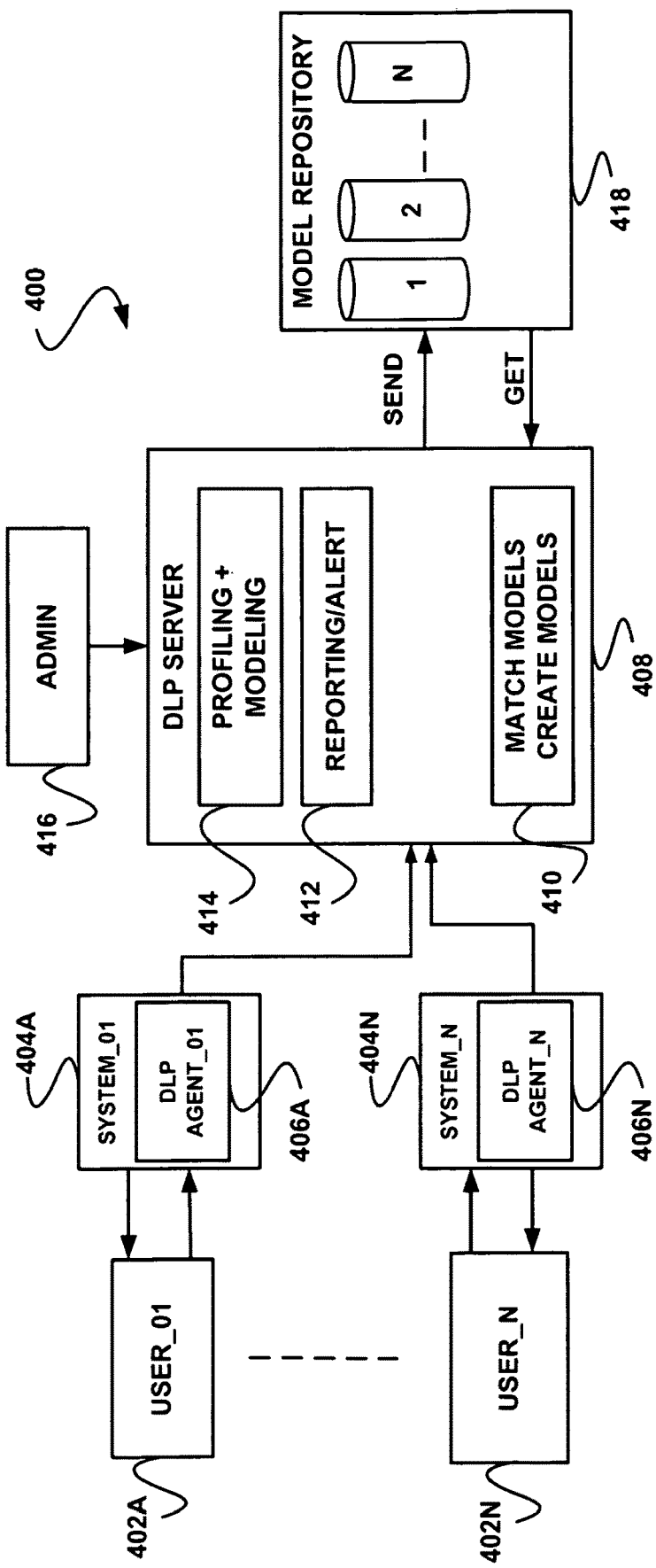
FIG. 4 shows a model-based system for detecting at least potentially unwanted activity associated with confidential data, in accordance with another embodiment.

FIG. 4 shows a model-based system 400 for detecting at least potentially unwanted activity associated with confidential data, in accordance with another embodiment. As an option, the system 400 may be implemented in the context of the architecture and environment of FIGS. 1-3. Of course, however, the system 400 may be implemented in any desired environment. It should also be noted that the aforementioned definitions may apply during the present description.

As shown, a plurality of users 402A-B each utilize an associated system 404A-B. Thus, the systems 404A-B may include any devices capable of being utilized by the users 402A-B (e.g. to access data, input data, etc.). Just by way of example, the systems 404A-B may each include any of the devices described above with respect to FIGS. 1 and/or 2.

In one embodiment, the users 402A-B may access confidential data (e.g. data predetermined to be confidential) via the systems 404A-B. In another embodiment, the users 402A-B may conduct actions in association with the confidential data. Such confidential data may optionally be stored on the systems 404A-B.

Additionally, the systems 404A-B each include a data leakage prevention (DLP) agent 406A-B. The DLP agents 406A-B may monitor use of confidential data (e.g. by the users 402A-B) based on predetermined parameters. For example, the DLP agents 406A-B may monitor use of confidential data for predetermined types of use capable of being performed with respect to the confidential data (e.g. reading, opening, scrolling, etc.). In various embodiments, the DLP agents 406A-B may monitor the use of the confidential data continuously, periodically (e.g. based on predefined intervals), on-demand, etc.

In response to detection of use of the confidential data utilizing the predetermined parameters, the DLP agents 406A-B may identify behavioral information associated with such use of the confidential data. The behavioral information may include a digital representation of actions performed (e.g. by the user 402A-B) with respect to the confidential data, in one embodiment. In another embodiment, the behavioral information may be represented by parameters corresponding to the use of the confidential data. Each of such parameters may optionally match one of the predetermined parameters based on which the use of the confidential data is detected. Just by way of example, if scrolling the confidential data is detected based on a predetermined parameters indicating such scrolling, the behavioral information associated with use of the confidential data may include a parameter indicating that the confidential data has been scrolled and may optionally indicate a frequency in which the confidential data has been scrolled, a length of time the confidential data has been scrolled, etc. In this way, the behavioral information associated with the use of the confidential data may be collected by the DLP agents 406A-B.

Further, the DLP agents 406A-B send the behavioral information to a server 408. Optionally, each of the systems 404A-N may be in communication with the server 408 over a network. Thus, the DLP agents 406A-B may send the behavioral information to the server 408 over the network, such that the server 408 may receive the behavioral information over the network.

With respect to the present embodiment, the server 408 may include any device capable of receiving the behavioral information from the DLP agents 406A-B and creating a model based on such behavioral information for use in detecting at least potentially unwanted activity. Just by way of example, the server 408 may include any of the servers described above with respect to FIGS. 1 and/or 2. As shown, the server 408 may include a DLP server, in one embodiment. Also, as an option, the network via which the behavioral information is received by the server 408 may include any of the networks described above with respect to FIG. 1.

In response to receipt of the behavioral information, a model creation and matching module 410 located on the server 408 creates a model utilizing the behavioral information. In one embodiment, the model creation and matching module 410 may create the model by storing the parameters representative of the behavioral information. In another embodiment, the model may be created by storing values in association with each of such parameters.

For example, a value may be determined for each of the parameters and may be stored in the model in association therewith. As an option, the manner in which the value is determined may be based on the parameter associated therewith. Just by way of example, if the parameter includes scrolling the confidential data, the value may indicate a frequency with which the scrolling is performed. As another example, if the parameter includes reading the confidential data, the parameter may include a length of time during which the confidential data is read (e.g. opened, etc.). As another option, the value for each parameter may be determined based on a weight of the parameter.

Furthermore, a profiling and modeling module 414 of the server 408 may generate metadata associated with the created model. With respect to the present embodiment, the metadata may include any information associated with the model. For example, in various embodiments, the metadata may include an identifier of at least one user 402A-B associated with the behavioral information utilized to create the model, an identifier of at least one data source (e.g. network share, etc.) associated with the confidential data (e.g. on which the data is stored), a type of document storing the confidential data, a score (e.g. a total score for the model determined based on the values of the parameters included in the model), etc.

Moreover, the profiling and modeling module 414 of the server 408 may assign the metadata to the model. In this way, the metadata may be stored in association with the model. As an option, an administrator 416 may utilize the server 408 to modify the model (e.g. the parameters, values, etc. stored therein) and/or the associated metadata as desired. For example, the administrator 408 may correlate parameters included in the model.

The server 408 also detects at least potentially unwanted activity associated with the confidential data utilizing the model. In one embodiment, the model creation and matching module 410 of the server 408 may compare the model to a plurality of predefined models stored in a model repository 418 (e.g. by querying the model repository 418 for a predefined model stored therein matching the model created by the server 408, etc.). The predefined models may include models previously generated (e.g. by the profiling and modeling module 414 of the server 408) based on use of confidential data determined to be unwanted activity. Thus, if the model created utilizing the behavioral information received from one of the systems 404A-B matches one of the predefined models (e.g. matches completely, matches a predefined amount, etc.), at least potentially unwanted activity associated with the confidential data may be detected.

In another embodiment, the model creation and matching module 410 of the server 408 may compare the score included in the metadata associated with the model with a predefined threshold. Accordingly, if the score meets the predefined threshold, as determined based on the comparison, at least potentially unwanted activity associated with the confidential data may optionally be detected. Of course, however, In response to detection of the potentially unwanted activity associated with the confidential data, a reporting and alerting module 412 of the server 408 may react. Such reaction may include any desired action capable of being performed by the server 408. In one embodiment, the reaction may include alerting the administrator 416 of the detection of the potentially unwanted activity. In another embodiment, the reaction may include reporting the detection of the potentially unwanted activity. In yet another embodiment, the reaction may include initiating remediation of the potentially unwanted activity. In still yet another embodiment, the reaction may include preventing user actions conducted in association with the confidential data (e.g. accessing the confidential data, etc.).

Figure 5:
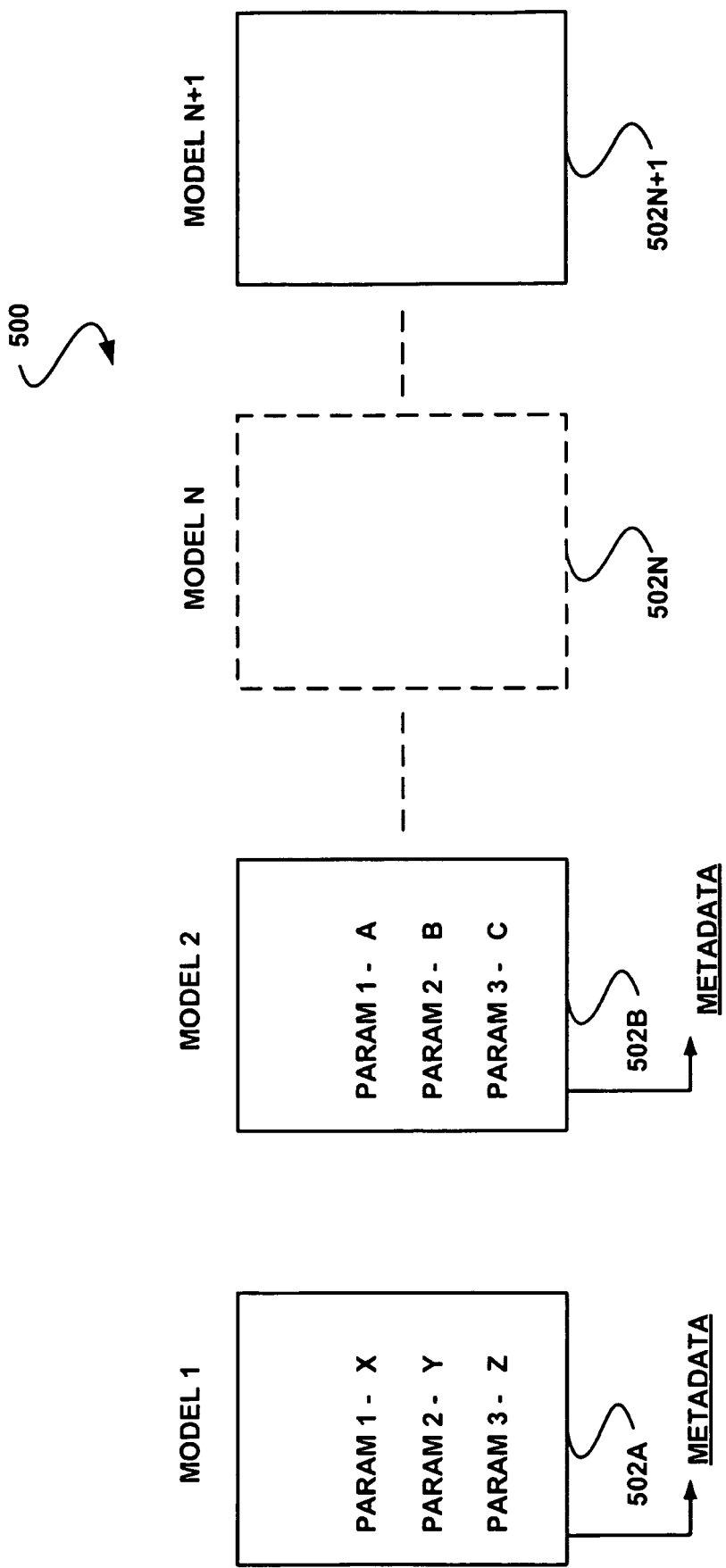
FIG. 5 shows a model repository storing plurality of models utilized for detecting potentially unwanted activity associated with confidential data, in accordance with yet another embodiment.

FIG. 5 shows a model repository 500 storing a plurality of models utilized for detecting potentially unwanted activity associated with confidential data, in accordance with yet another embodiment. As an option, the model repository 500 may be implemented in the context of the architecture and environment of FIGS. 1-4. For example, the model repository 500 may be implemented in the context of the model repository 418 of FIG. 4. Of course, however, the model repository 500 may be implemented in any desired environment. Again, it should be noted that the aforementioned definitions may apply during the present description.

As shown, the model repository 500 includes a plurality of models 402A-N+1 indicative of known unwanted activity associated with confidential data (e.g. activity predetermined to be unwanted with respect to the confidential data, etc.). In one embodiment, the models 402A-N+1 may be created manually (e.g. by an administrator). In another embodiment, the models 402A-N+1 may be created automatically based on actual incidents of unwanted activity associated with confidential data that have previously been detected (e.g. actual data leakage of confidential data that have been detected).

Each of the models 402A-N+1 includes at least one parameter, as shown. In addition, each parameter may optionally represent a use of the confidential data. For example, one parameter may indicate that the confidential data has been revisited, another one of the parameters may indicate that the confidential data has been scrolled, etc.

Furthermore, a value is stored in association with each parameter included in the models 402A-N+1 (e.g. see 'X', 'Y', 'Z' etc.). The value may include details associated with the parameter, in one embodiment. Just by way of example, if the parameter indicates that the confidential data has been revisited, the associated value may identify a number of times the confidential data has been revisited (e.g. within a predetermined period of time, etc.). As another example, if the parameter indicates that the confidential data has been scrolled, the associated value may identify a frequency in which the confidential data has been scrolled.

In another embodiment, the value may include a weight for the associated parameter. As an option, the weight may be based on a type of the parameter, details associated with the parameter, etc. As another option, the weight may be calculated based on a comparison of details of the parameter with average details previously determined for the parameter (e.g. based on previous use of the confidential data by other users, etc.). For example, if the use of the confidential data exceeds a predetermined average use of the confidential data, the value associated with the parameter indicative of such use may be weighted more than if the use of the confidential data does not exceed the predetermined average use of the confidential data.

As also shown, metadata is assigned to each of the models 402A-N+1. The metadata may include any information associated with the parameters included in the model. In various embodiments, the metadata may include identifiers of users associated with the use of the confidential data (e.g. that used the confidential data), a total score for the model (e.g. calculated based on the values for each of the parameters), a type of document in which the confidential data is stored, etc.

Figure 6:
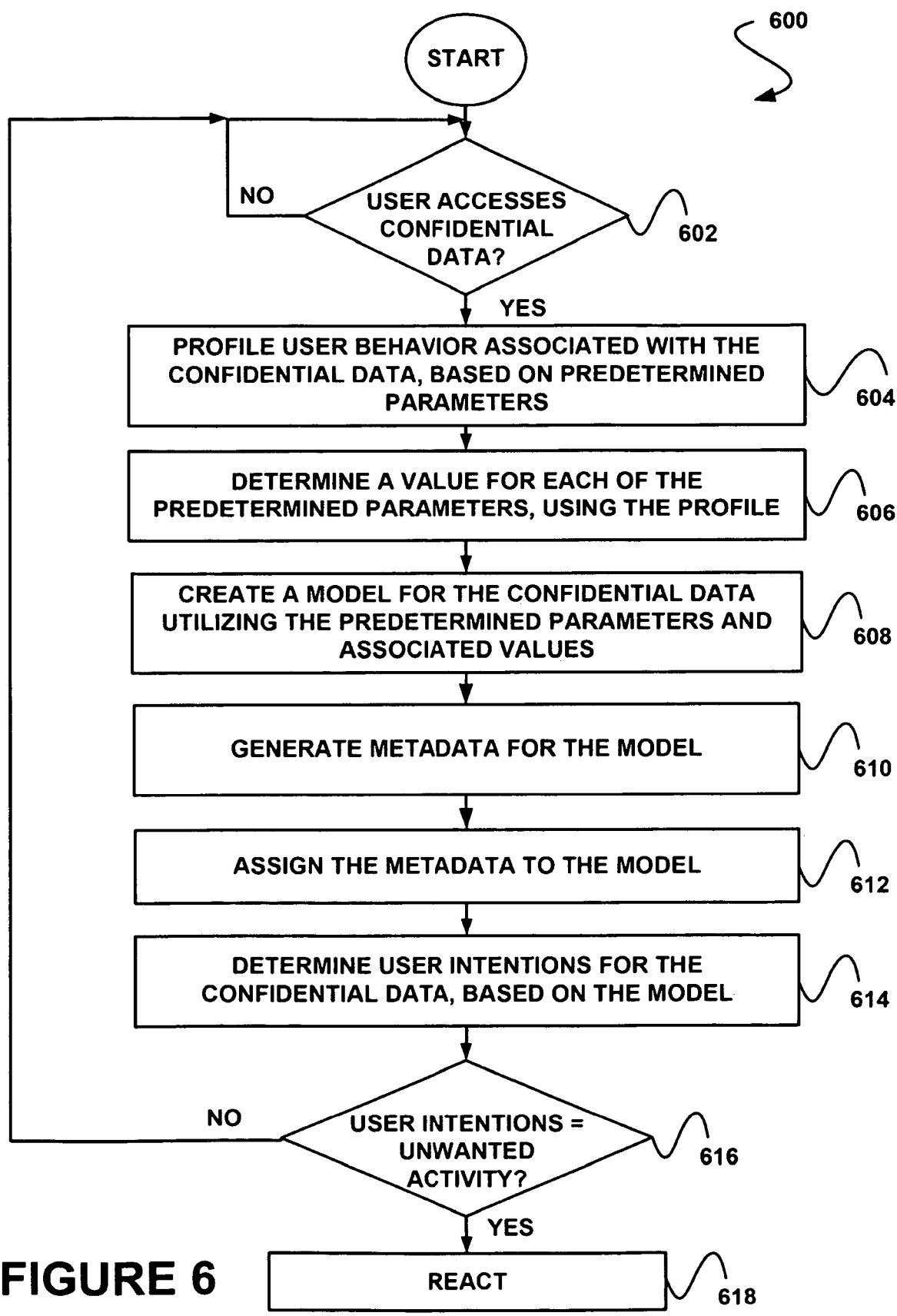
FIG. 6 shows a method for creating a model utilized for detecting potentially unwanted activity associated with confidential data, in accordance with still yet another embodiment.

FIG. 6 shows a method 600 for creating a model utilized for detecting potentially unwanted activity associated with confidential data, in accordance with still yet another embodiment. As an option, the method 600 may be carried out in the context of the architecture and environment of FIGS. 1-5. Of course, however, the method 600 may be carried out in any desired environment. It should also be noted that the aforementioned definitions may apply during the present description.

As shown in decision 602, it is determined whether a user accesses confidential data. With respect to the present embodiment, the user may access the confidential data in any manner that includes interaction with the confidential data. For example, the user may access the data by reading the confidential data, opening the confidential data, scrolling the confidential data, etc.

As an option, the determination may be made based on monitoring of the confidential data. In one embodiment, use of the confidential data may be monitored. Thus, any digital signals indicative of use of the confidential data may optionally be detected based on the monitoring.

If it is determined that a user does not access confidential data, the method 600 continues to wait for a determination that a user accesses confidential data. If, however, it is determined that a user accesses confidential data, user behavior associated with the confidential data is profiled based on predetermined parameters. Note operation 604. Such user behavior may include any use of the confidential data capable of being profiled based on the predetermined parameters. For example, the user behavior may include activity performed by the user with respect to the confidential data, such as an interaction performed with respect to the confidential data.

In one embodiment, the user behavior may be profiled if the user behavior is of a type that is indicated by the predetermined parameters. Just by way of example, the predetermined parameters may include types of use of the confidential data capable of being performed by a user which are predetermined as types to be profiled (e.g. based on monitoring, etc.). Accordingly, profiling the user behavior may optionally include identifying a profile of behavioral information associated with use of the confidential data, such behavioral information including digital data representative of the use of the confidential data.

Additionally, as shown in operation 606, a value for each of the predetermined parameters is determined, using the profile. In one embodiment, a value may optionally only be determined for each of the predetermined parameters associated with the profile of the user behavior. For example, if a predetermined parameter indicates use of the confidential data that is not detected with respect to the confidential data, the value for such predetermined parameter may not be determined. As another option, the value for a predetermined parameter indicative of use of the confidential data that is not detected with respect to the confidential data may be null, zero, etc.

However, a value may be determined for predetermined parameter indicative of use of the confidential data that has been detected with respect to the confidential data. The value may indicate information associated with the predetermined parameter, as an option. As another option, the value may indicate a weight for the predetermined parameter.

Further, a model is created for the confidential data utilizing the predetermined parameters and associated values, as shown in operation 608. In one embodiment, the model may be created by storing the predetermined parameters and the associated values in a data structure. In this way, the data structure may represent the model.

Still yet, metadata for the model is generated, as shown in operation 610. The metadata may be generated automatically based on the confidential data, in one embodiment. For example, the metadata may include a type of a document in which the confidential data is stored. In another embodiment, the metadata may be generated automatically based on the values associated with the parameters included in the model. For example, the metadata may include a total score for the model calculated based on the values of the parameters. Of course, in another embodiment, the metadata may be manually generated (e.g. by an administrator, etc.).

Moreover, the metadata is assigned to the model. Note operation 614. The metadata may be assigned to the model by linking the metadata to the model, in one embodiment. In another embodiment, the metadata may be assigned to the model by storing the metadata in association with the model.

Still yet, user intentions for the confidential data are determined, based on the model. Note operation 614. The user intentions may include a purpose for the use of the confidential data by the user. Thus, determining the user intentions may include determining whether the use of the confidential data by the user includes at least potentially unwanted activity.

As an option, the model may be compared to predefined models known to be associated with at least potentially unwanted activity. Thus, if the model matches one of such predefined models, it may be determined that the use of the confidential data includes unwanted activity, and thus that the user intentions include unwanted activity (e.g. data leakage of the confidential data, etc.). However, if the model does not match one of the predefined models, it may be determined that the use of the confidential data does not include unwanted activity, and thus that the user intentions do not include unwanted activity.

As another option, the score included in the metadata may be compared to a threshold for determining the user intentions. If the score meets the threshold, it may be determined that that the user intentions include unwanted activity. If, however, the score does not meet the threshold, it may be determined that the user intentions do not include unwanted activity.

It decision 616 it is determined whether the user intentions include unwanted activity. If it is determined that the user intentions do not include unwanted activity, the method 600 returns to decision 602 for determining whether another user access of confidential data is detected. In this way, the user access to the confidential data may be allowed.

If it is determined that the user intentions include unwanted activity, a reaction is performed. Note operation 618. The reaction may be to the user access to the confidential data (detected in decision 502), for example. In various embodiments, the reaction may include denying any subsequent access to the confidential data, alerting an administrator, storing the model in the model repository as a predefined model (e.g. for use in comparing against subsequently generated models), etc.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer readable medium comprising instructions that, when executed by at least one processor, cause the at least one processor to at least:
   detect an attempt by a user to access confidential data stored on an electronic device;
   identify behavioral information based on the confidential data according to one or more predetermined parameters, the predetermined parameters respectively representing a corresponding type of interaction with the confidential data;
   create a model utilizing the behavioral information, the model created based on the predetermined parameters and their associated values, the associated values including at least one of an information associated with a predetermined parameter or a weight for the predetermined parameter, the information and weight corresponding to user actions conducted in association with the confidential data;
   generate metadata associated with the model, the metadata including an identifier of the user associated with the behavioral information, the identifier including a type of document storing the confidential data;
   query a model repository for one or more predefined models, the predefined models generated using metadata profiling prior to the creation of the model;
   compare the model with the one or more predefined models representative of known unwanted activity, the unwanted activity including activity disclosing confidential data;
   detect at least a first action by the user associated with the confidential data based on the comparison, the first action detected based on a behavioral information threshold, the first action identified as a known unwanted activity when the behavioral information threshold is reached; and in response to the detection that the first action is the unwanted activity, store the model in a repository as one of the one or more predefined models, the one or more predefined models used to prevent subsequent user access to the confidential data or alert an administrator of the unwanted activity.

2. The non-transitory computer readable medium of claim 1, wherein the one or more predetermined parameters represent at least one of a scroll of the confidential data, a revisit of the confidential data, a generation of indicia in association with the confidential data, and a digitally-based marking of the confidential data, the digitally-based marking including at least one of highlighting or annotating.

3. The non-transitory computer readable medium of claim 1, wherein the instructions, when executed, cause the at least one processor to record values reflecting the interaction by the user with the confidential data according to the one or more predetermined parameters.

4. The non-transitory computer readable medium of claim 3, wherein the instructions, when executed, cause the at least one processor to aggregate the predetermined parameters and the values.

5. The non-transitory computer readable medium of claim 1, wherein the instructions, when executed, cause the at least one processor to allow the model to be created manually.

6. The non-transitory computer readable medium of claim 1, wherein the instructions, when executed, cause the at least one processor to create the model automatically.

7. The non-transitory computer readable medium of claim 1, wherein the instructions, when executed, cause the at least one processor to identify the behavioral information by collecting the behavioral information utilizing an agent.

8. The non-transitory computer readable medium of claim 1, wherein the instructions, when executed, cause the at least one processor to access the behavioral information via a network.

9. The non-transitory computer readable medium of claim 1, wherein the identifier of the user includes an identifier of at least one data source associated with the confidential data and a score.

10. A system, comprising:
a processor; and
a memory storing executable instructions that when executed by the processor cause the processor to:
  detect an attempt by a user to access confidential data stored on an electronic device;
  identify behavioral information based on the confidential data based on one or more predetermined parameters, respective ones of the one or more predetermined parameters corresponding to types of interactions with the confidential data;
  create a model utilizing the behavioral information, the model created based on the predetermined parameters and their associated values, the associated values including at least one of an information associated with a predetermined parameter or a weight for the predetermined parameter, the information and weight corresponding to user actions conducted in association with the confidential data;
  generate metadata associated with the model, the metadata including an identifier of the user associated with the behavioral information, the identifier including a type of document storing the confidential data;
  query a model repository for one or more predefined models, the predefined models generated using metadata profiling prior to the creation of the model;
  compare the model with the one or more predefined models representative of known unwanted activity, the unwanted activity including activity disclosing confidential data;
  detect at least a first action by the user associated with the confidential data based on the comparison, the first action detected based on a behavioral information threshold, the first action a known unwanted activity when the behavioral information threshold is reached; and
  store the model in a repository as one of the one or more predefined models in response to the detection that the first action is the unwanted activity, the one or more predefined models used to prevent subsequent user access to confidential data or alert an administrator of the unwanted activity.

* * * * *